2,831,014

NEW COMPOUNDS CONTAINING PHOSPHORUS AND SULPHUR

Richard Sallmann, Binningen, near Basel, and Paul Kohler, Aigle, Switzerland, assignors to Ciba Limited, Basel, Switzerland, a Swiss firm No Drawing. Application November 14, 1955
Serial No. 546,776

Claims priority, application Switzerland
November 17, 1954

6 Claims. (Cl. 260—461)

This invention provides new compounds containing phosphorus and sulphur of the general formula (I)
$$R_1Y\underset{O}{\overset{R-X}{\underset{\|}{P}}}-CCl_2-COO-R_2S-R_3$$

in which R, $R_1$ and $R_3$ each represent an alkyl, cycloalkyl, aralkyl, aryl or heterocyclic residue which may contain substituents, and R and $R_1$ may be members of a ring system, $R_2$ represents an alkylene residue which may be interrupted by hetero atoms, and X and Y represent —O—, —S—, —NH— or NR.

These compounds are valuable agents for combating pests, and those of suitable constitution possess an internal therapeutic, so-called systemic, action.

The aliphatic residues, which the symbols R, $R_1$ and $R_3$ in the above formula may represent, may have straight or branched chains and be saturated or unsaturated, and may be unsubstituted or may contain substituents. There may be mentioned, for example, methyl, ethyl, propyl, isopropyl, butyl, hexyl, 2-ethylbutyl, octyl, 2-butyloctyl, dodecyl, octadecyl, allyl, 2-chlorethyl, and they may be radicals containing hydroxyl, thiocyano, cyano or ester groups.

The residues R, $R_1$ and $R_3$ may be identical or different from one another. The aromatic radicals, which R, $R_1$ and $R_3$ may represent, may be mononuclear or polynuclear and may contain nuclear substituents. There may be mentioned phenyl, 2- or 4-chlorophenyl, 2,4-dichlorophenyl, 4-methoxyphenyl, 4-nitrophenyl, naphthyl or 4-diphenyl groups. Among the araliphatic radicals, which R, $R_1$ and $R_3$ may represent, there may be mentioned the benzyl group, and among the cycloaliphatic radicals the cyclohexyl group, and among the heterocyclic radicals the tetrahydrofurfuryl group. The residues R, $R_1$ and $R_3$ are advantageously alkyl residues of low molecular weight. The symbols X and Y preferably represent —O— or $>NR_1$. The residue $R_2$ is more especially an alkylene residue of low molecular weight. The following alkylene residues may be mentioned:

$$-CH_2CH_2-, -CH_2-\underset{CH_3}{\overset{|}{CH}}-$$

$$-CH_2-CH_2-O-CH_2-CH_2-, -CH_2-CH_2-S-CH_2-CH_2-$$

Of special interest are compounds of the general formulae (II)
$$\underset{alkyl-O}{\overset{alkyl-O}{\underset{\diagup}{\searrow}}}\underset{O}{\overset{\|}{P}}-CCl_2COO\text{-alkylene-S-alkyl}$$

(III)
$$\underset{alkyl-O}{\overset{alkyl}{\underset{\diagup}{\searrow}}}\underset{O}{\overset{\|}{P}}-CCl_2-COO\text{-alkylene-S-alkyl}$$

and (IV)
$$\underset{alkyl}{\overset{alkyl}{\underset{\diagup}{\searrow}}}\underset{alkyl-N}{\overset{N}{\underset{\diagup}{\searrow}}}\underset{O}{\overset{\|}{P}}-CCl_2-COO\text{-alkylene-S-alkyl}$$

in which "alkyl" represents an alkyl residue having 1–4 carbon atoms and "alkylene" represents an alkylene residue having 2–4 carbon atoms.

The invention also provides various processes for the manufacture of the compounds of the above general formula, which processes may be represented as follows:

(a)
$$\underset{R_1-Y}{\overset{R-X}{\underset{\diagup}{\searrow}}}P-OR_4 + CCl_3-COOR_2-SR_3 \longrightarrow$$

Compound of the Formula I + $R_4Cl$ (b)
$$\underset{R_1Y}{\overset{R-X}{\underset{\diagup}{\searrow}}}\underset{O}{\overset{\|}{P}}-CCl_2-COOR_4 + HOR_2SR_3 \longrightarrow$$

Compound of the Formula I + $R_4OH$ (c)
$$\underset{R_1Y}{\overset{R-X}{\underset{\diagup}{\searrow}}}\underset{O}{\overset{\|}{P}}-CCl_2-COOR_2SM + HalR_3 \longrightarrow$$

Compound of the Formula I + MHa (d)
$$\underset{R_1Y}{\overset{R-X}{\underset{\diagup}{\searrow}}}\underset{O}{\overset{\|}{P}}-CCl_2-COOR_2Hal + MSR_3 \longrightarrow$$

Compound of the Formula I + MHal

In these formulae the symbols have the meanings given above, $R_4$ represents a lower alkyl residue, Hal represents a halogen atom and M represents a metal, especially an alkali metal.

Which of the above reactions is chosen depends on the accessibility of the reaction components required. The starting materials are either known or can be made by methods in themselves known. Preferably Reaction a is used. As this type of reaction is often exothermic, it may be necessary to mix the components together while cooling and dilute them with an inert solvent, such as benzene, toluene, ether, dioxane, hexane or low boiling benzene. The reaction is advantageously completed by heating the mixture at about 50–120° C. If the reaction components are suitably chosen, the condensation products can be distilled under reduced pressure.

As stated above, the new compounds possess valuable properties for combating pests.

Accordingly, the invention also provides a process of combating pests in which a compound of the above general Formula I, especially one of the Formula II, III, or IV is used in admixture with a liquid or solid diluent. For combating pests the usual methods may be used, for example, the objects to be protected may be treated with the new compounds in the form of dusting preparations or spraying preparations, for example, as solutions or suspensions, which may be prepared with water or suitable organic solvents, for example, alcohol, petroleum, tar distillates or the like. Aqueous solutions or aqueous emulsions of organic solvents which contain the active substances, may be used for brushing, spraying or immersing the objects to be protected.

The spraying or dusting preparations may contain the usual inert filling materials or identifying agents, for example, kaolin, gypsum or bentonite, or other additions, such as sulphite cellulose waste liquor, cellulose derivatives or the like, and also the usual wetting agents or adhering agents, for improving the wetting power and adhesive power of the preparations. The preparations may be made up in powdered form, in the form of aqueous dispersions or pastes, or in the form of self-dispersing oils.

The new compounds may be present in the preparations as the sole active substance or in admixture with another insecticide and/or fungicide. The preparations may be used for the protection of plants by the usual spraying or dusting methods.

The following examples illustrate the invention, the parts being by weight unless otherwise stated, and the relationship of parts by weight to parts by volume being the same as that of the kilogram to the litre:

EXAMPLE 1

8 parts of the ester of trichloracetic acid with β-oxyethyl-methyl sulphide are mixed with 5.5 parts of triethyl phosphite. The rise in temperature which sets in after a short time is moderated to some extent by slight cooling, so that the reaction proceeds at about 70° C. When the temperature begins to fall, the mixture is heated for 15 minutes on a steam bath, and the resulting ethyl chloride is distilled off. After heating the residue for a short time at 90–100° C. under 0.5 mm. pressure, 9.8 parts of a brownish oil are obtained which is soluble in the usual organic solvents.

EXAMPLE 2

A mixture of 9.6 parts of the ester of trichloracetic acid with β-oxy-diethylsulphide and 9.15 parts of triethylphosphite is allowed to stand. After a short time the temperature slowly rises to 70–80° C. with the evolution of gas. When the temperature begins to fall, the mixture is heated for 10 minutes on a steam bath, whereby the evolution of gas is brought to an end. After removing the volatile constituents under reduced pressure, 12.9 parts of a brownish oil are obtained.

In the same manner the following compounds can be prepared:

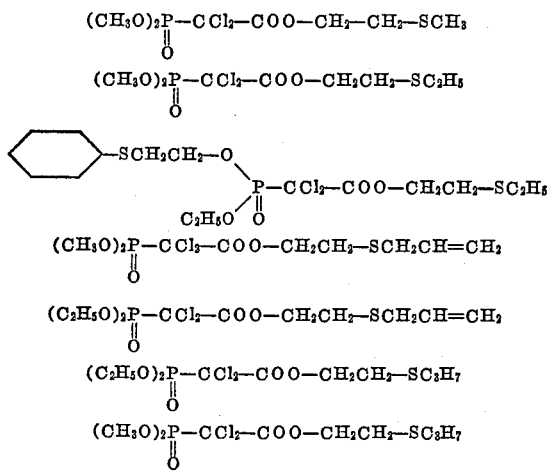

EXAMPLE 3

2 parts of the product obtained as described in Example 1 or 2 are mixed with 1 part of the condensation product of tertiary octyl phenol with 8 mols of ethylene oxide and 7 parts of isopropyl alcohol. A clear solution is obtained which can be emulsified by pouring it into water. In order to demonstrate the internal therapeutic, so-called systemic, action of the preparation the following tests were carried out, and in each case a spraying liquor having a content of 0.1 percent of the active substance was used.

Test No. 1

14 day old broad bean plants (*Vicia fabae*) grown in separate pots were sprayed with the solution to be tested without allowing the spraying liquor to reach the earth in which the plants were growing.

24 hours after spraying 35 aphids (*Doralis fabae*) were placed on each plant. After 24 hours the living aphids on the plants were counted, and the count was repeated after 48 hours.

In each group of experiments non-sprayed control plants were used, and in this manner any wandering away or increase due to young aphids was taken into account. In the following table are given the average values of 10 tests. Only the statistically reliable values were included.

|  | Product of Example 1 | | Product of Example 2 | |
| --- | --- | --- | --- | --- |
|  | 24 hours after applying aphids | 48 hours after applying aphids | 24 hours after applying aphids | 48 hours after applying aphids |
| Percentage of living aphids found on the plants | 32 | 18 | 13 | 0 |

Test No. 2

The lower halves of three weeks' old broad bean plants affected with aphids were sprayed with the spraying liquor to be tested so that the spraying liquor did not reach the earth in which the plants were growing.

The living lice on the non-sprayed parts of the plants were counted, first 24 hours after spraying and then 48 hours after spraying. Non-sprayed plants were used as controls as in Test No. 1.

In the following table are given the average values of 10 statistically reliable tests.

|  | Product of Example 1 | | Product of Example 2 | |
| --- | --- | --- | --- | --- |
|  | 24 hours after spraying | 48 hours after spraying | 24 hours after spraying | 48 hours after spraying |
| Percentage of living aphids found on the plants | 39 | 7 | 36 | 18 |

EXAMPLE 4

1 part of the product of the formula

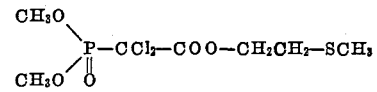

is mixed with 99 parts of talcum. There is obtained a dusting powder which is very active against the house fly, *Musca domestica*.

EXAMPLE 5

20 parts of the product of the formula

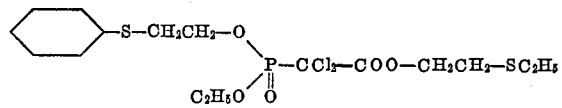

10 parts of the condensation product from 1 mol of dodecyl mercaptan and 12 mols of ethylene oxide, and 70 parts of isopropanol are mixed. There is obtained a spray concentrate which can be used for treatment during the summer season. By spraying fruit trees or other plants with a spraying liquor containing 0.02 percent of the active substance the following insects can be combated: Aphids, like greenhouse aphids, wooly apple aphid (*Eriosoma lanigerum*), Tetranychidae (spider mites), *Trialeurodes vaporariorum* (greenhouse white fly), *Pseudococcus citrici* (citrus mealy bug).

EXAMPLE 6

50 parts of the product of the formula

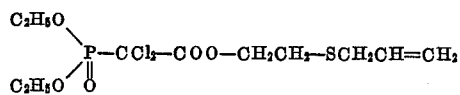

and 50 parts of the sodium salt of a petroleum sulfonic acid are mixed. There is obtained a spray concentrate which can be used for treatment during the summer season. By spraying fruit trees or other plants with a spraying liquor containing 0.02 percent of the active substance aphids and spider mites can be combated.

EXAMPLE 7

A 5 percent solution of the product of Example 6 in acetone or kerosene may be sprayed on the walls of a room in order to combat flies like *Musca domestica*.

What is claimed is:

1. A phosphorus and sulfur containing compound of the general formula

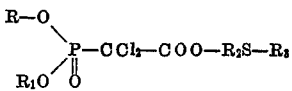

wherein R is a member selected from the group consisting of alkyl radicals containing 1 to 4 carbon atoms and the phenyl-thio-ethyl radical, $R_1$ represents an alkyl radical of 1 to 4 carbon atoms, $R_3$ represents an aliphatic hydrocarbon radical of 1 to 4 carbon atoms, and $R_2$ represents a low molecular weight alkylene radical.

2. A phosphorus and sulfur containing compound of the general formula

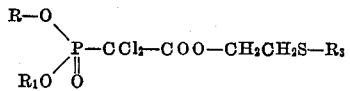

wherein each of R, $R_1$ and $R_3$ represents an alkyl radical of 1 to 4 carbon atoms.

3. The compound of the formula

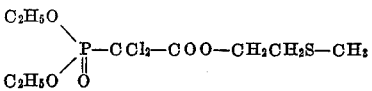

4. The compound of the formula

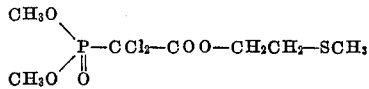

5. The compound of the formula

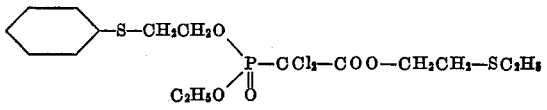

6. The compound of the formula

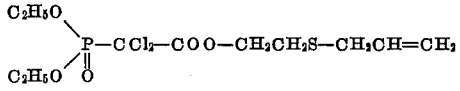

References Cited in the file of this patent

FOREIGN PATENTS 723,633    Great Britain _____ Feb. 9, 1955